US012529152B2

United States Patent
Shi et al.

(10) Patent No.: US 12,529,152 B2
(45) Date of Patent: Jan. 20, 2026

(54) METHOD FOR PREPARING GLYCOLLATE BY ELECTRO-CATALYZING ETHYLENE GLYCOL OR ELECTRO-CATALYTICALLY REFORMING WASTE PLASTIC POLYETHYLENE TEREPHTHALATE (PET)

(71) Applicant: Technical Institute of Physics and Chemistry of the Chinese Academy of Sciences, Beijing (CN)

(72) Inventors: Rui Shi, Beijing (CN); Yong Chen, Beijing (CN)

(73) Assignee: TECHNICAL INSTITUTE OF PHYSICS AND CHEMISTRY OF THE CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/561,518

(22) PCT Filed: Apr. 25, 2023

(86) PCT No.: PCT/CN2023/090460
§ 371 (c)(1),
(2) Date: Nov. 16, 2023

(87) PCT Pub. No.: WO2023/221748
PCT Pub. Date: Nov. 23, 2023

(65) Prior Publication Data
US 2025/0084540 A1    Mar. 13, 2025

(30) Foreign Application Priority Data

May 16, 2022  (CN) .......................... 202210527916.7

(51) Int. Cl.
C25B 3/07     (2021.01)
C25B 1/04     (2021.01)
(Continued)

(52) U.S. Cl.
CPC ................. *C25B 3/07* (2021.01); *C25B 1/04* (2013.01); *C25B 3/23* (2021.01); *C25B 3/25* (2021.01);
(Continued)

(58) Field of Classification Search
CPC .................................... C25B 3/07; C25B 3/23
(Continued)

(56) References Cited

FOREIGN PATENT DOCUMENTS

CN       109601881 A  *  4/2019    ............. A23L 13/52
CN       113774399 A  *  12/2021   ............... C25B 1/04
(Continued)

OTHER PUBLICATIONS

Da Silva et al., "Insight into the Electrooxidation Mechanism of Ethylene Glycol on Palladium-Based Nanocatalysts: In Situ FTIRS and LC-MS Analysis," ChemElectroChem. (Nov. 2, 2020), vol. 7, No. 21, pp. 4326-4335. (Year: 2020).*

(Continued)

*Primary Examiner* — Edna Wong
(74) *Attorney, Agent, or Firm* — RANKIN, HILL & CLARK LLP

(57) ABSTRACT

The present invention discloses a method for preparing glycollate by electro-catalyzing ethylene glycol. The method for preparing glycollate by electro-catalytically ethylene glycol includes: assembling an anode catalyst, a cathode catalyst and an alkaline electrolyte containing the ethylene glycol into an electrolytic cell, and applying voltage for electrocatalytic reaction, where the ethylene glycol is oxidized at an anode to generate glycollate, and water is reduced at a cathode to generate hydrogen. The alkaline electrolyte containing the ethylene glycol can be obtained by dissolving waste plastic polyethylene terephthalate (PET) into an alkali liquid, and carrying out solid-liquid separation after hydrolysis reaction.

16 Claims, 10 Drawing Sheets

(51) Int. Cl.
*C25B 3/23* (2021.01)
*C25B 3/25* (2021.01)
*C25B 11/054* (2021.01)
*C25B 11/081* (2021.01)
*C25B 11/089* (2021.01)

(52) U.S. Cl.
CPC .......... *C25B 11/054* (2021.01); *C25B 11/081* (2021.01); *C25B 11/089* (2021.01)

(58) Field of Classification Search
USPC .............................................. 205/440, 443
See application file for complete search history.

(56) References Cited

FOREIGN PATENT DOCUMENTS

| CN | 113788747 | | 12/2021 | | |
|---|---|---|---|---|---|
| CN | 113897628 | | 1/2022 | | |
| CN | 113897628 | A * | 1/2022 | ............... | C25B 9/19 |
| CN | 215517653 | | 1/2022 | | |
| CN | 215517653 | U * | 1/2022 | ............... | B09B 3/00 |

OTHER PUBLICATIONS

Ma et al., "Electrochemical PET Recycling to Formate Through Ethylene Glycol Oxidation on Ni—Co—S Nanosheet Arrays," Journal of Materials Chemistry A (2024), vol. 12, No. 48, pp. 33917-33925. (Year: 2024).*

Shi et al., "Electrocatalytic Reforming of Waste Plastics into High Value-Added Chemicals and Hydrogen Fuel," Chemical Communications (2021), vol. 57, No. 94, pp. 12595-12598. (Year: 2021).*

Verlato et al., "Preparation of Pd-Modified Ni Foam Electrodes and Their Use as Anodes for the Oxidation of Alcohols in Basic Media," Electrocatalysis (Mar. 2012), vol. 3, pp. 48-58. (Year: 2012).*

Si et al., "Highly Selective and Efficient Electrocatalytic Synthesis of Glycolic Acid in Coupling with Hydrogen Evolution," Chem Catalysis. (Sep. 16, 2021), vol. 1, No. 4, pp. 941-955. (Year: 2021).*

Carta et al., "Chemical Recycling of Poly(Ethylene Terephthalate) (PET) by Hydrolysis and Glycolysis," Environmental Science and Pollution Research (Nov. 2003), vol. 10, pp. 390-394. (Year: 2003).*

Xin et al., "Electrocatalytic Oxidation of Ethylene Glycol (EG) on Supported Pt and Au Catalysts in Alkaline Media: Reaction Pathway Investigation in Three-Electrode Cell and Fuel Cell Reactors," Applied Catalysis B: Environmental (Aug. 21, 2012), vol. 125, pp. 85-94. (Year: 2012).*

Office action in Chinese App. No. 202210527916.7, published Jul. 17, 2023, 4 pgs.

Ji Qi et al., Electrocatalytic selective oxidation of ethylene glycol: A concise review of catalyst development and reaction mechanism with comparison to thermocatalytic oxidation process, Current Opinion in Electrochemistry, Dec. 28, 2021, 10 pgs.

* cited by examiner

METHOD FOR PREPARING GLYCOLLATE BY ELECTRO-CATALYZING ETHYLENE GLYCOL OR ELECTRO-CATALYTICALLY REFORMING WASTE PLASTIC POLYETHYLENE TEREPHTHALATE (PET)

BACKGROUND OF THE INVENTION

Technical Field

The present invention relates to the field of electrochemical catalysis, and in particular to a method for preparing glycollate by electro-catalyzing ethylene glycol or electro-catalytically reforming waste plastic polyethylene terephthalate (PET).

Description of Related Art

Glycolic acid, also known as hydroxyacetic acid, functions as an important raw material of organic synthesis and chemical product, and has been widely used in fields such as organic synthesis, printing and dyeing, cosmetics, electroplating, and petroleum industry. Its polymer can further be used as a biodegradable material for medical treatment, packaging, and multiple other fields. At present, industrially synthetized glycolic acid mainly uses chloroacetic acid as a raw material, and is obtained in a mode of preparing sodium glycollate, then esterifying the sodium glycollate with methanol to produce methyl glycollate, and then hydrolyzing and purifying the methyl glycollate. The synthesis route has high synthesis cost, and the raw material chloroacetic acid is highly toxic and corrosive, and belongs to class 6 hazardous chemicals. In view of this, it is urgently practical to develop a low-cost and large-scale production method for glycolic acid.

Polyethylene terephthalate (PET), one of the most commonly used plastic packaging materials worldwide, has been widely used in various fields such as food, pharmaceuticals, chemicals and clothing, and has apparent consumption reaching 32.98 million tons in 2020 in China. However, the PET has stable chemical properties and a degradation cycle reaching 200 years to 400 years in a natural environment. As a result, it is necessary to strengthen recycling of waste PET to prevent the waste PET from polluting the environment and wasting carbon resources. Therefore, if the waste plastic PET as a raw material can be catalytically reformed into glycollate, environmental pollution can be effectively reduced, the goal of resource conservation can be achieved, and huge economic benefits can further be brought.

BRIEF SUMMARY OF THE INVENTION

An objective of the present invention is to provide a method for preparing glycollate by electro-catalyzing ethylene glycol.

Another objective of the present invention is to provide a method for preparing glycollate by electro-catalytically reforming waste plastic polyethylene terephthalate (PET).

In order to achieve the above objective, the present invention uses the following technical solution:

in a first aspect, the present invention provides a method for preparing glycollate by electro-catalyzing ethylene glycol. The method includes:
assembling an anode catalyst, a cathode catalyst and an alkaline electrolyte containing the ethylene glycol into an electrolytic cell, and applying voltage for electro-catalytic reaction, where the ethylene glycol is oxidized at an anode to generate the glycollate, and water is reduced at a cathode to generate hydrogen;
the anode catalyst is selected from at least one of palladium-supported foam metal, palladium alloy-supported foam metal, platinum-supported foam metal, and platinum alloy-supported foam metal; and
the cathode catalyst is foam metal and/or a supported catalyst; and the supported catalyst is selected from at least one of platinum-supported foam metal, platinum alloy-supported foam metal, nickel phosphide-supported foam metal, and cobalt phosphide-supported foam metal.

Further, a palladium alloy is selected from at least one of a palladium-nickel alloy, a palladium-ruthenium alloy, a palladium-platinum alloy and a palladium-iridium alloy in the above method.

A platinum alloy is selected from at least one of a platinum-iridium alloy, a platinum-nickel alloy and a platinum-ruthenium alloy.

In the anode catalyst, a material supported on per square centimeter of foam metal has a total amount ranging from 1 mg to 10 mg.

In the cathode catalyst, a material supported on per square centimeter of foam metal has a total amount ranging from 0.2 mg to 2 mg when the cathode catalyst is the supported catalyst.

In the anode catalyst or the cathode catalyst, the foam metal is selected from at least one of foam nickel, foam copper, foam iron and foam cobalt separately, and is preferably the foam nickel.

A molar concentration ratio of the ethylene glycol to alkali is 1:1 to 1:5 in the alkaline electrolyte containing the ethylene glycol.

The alkali is potassium hydroxide or sodium hydroxide, and is more preferably sodium hydroxide.

the applied voltage ranges from 0.5 V to 1.5 V.

After the electrocatalytic reaction, the method further includes an operation of separating and purifying the glycollate, and the operation specifically includes: carrying out color removal through activated carbon, drying, washing, dissolution and filtering, and recrystallization on an electrolyzed solution to obtain separated and purified glycollate; and preferably, a washing liquid for washing is at least one of dichloromethane, methanol, ethanol and water.

In a second aspect, the present invention provides a method for preparing glycollate by electro-catalytically reforming waste plastic polyethylene terephthalate (PET). The method includes:
1) dissolving the waste plastic PET into an alkali liquid, and carrying out solid-liquid separation after hydrolysis reaction to obtain an alkaline electrolyte containing ethylene glycol; and
2) assembling an anode catalyst, a cathode catalyst and the alkaline electrolyte containing the ethylene glycol into an electrolytic cell, and applying voltage for electrocatalytic reaction, where the ethylene glycol is oxidized at an anode to generate glycollate, and water is reduced at a cathode to generate hydrogen;
the anode catalyst is selected from at least one of palladium-supported foam metal, palladium alloy-supported foam metal, platinum-supported foam metal, and platinum alloy-supported foam metal; and
the cathode catalyst is foam metal and/or a supported catalyst; and the supported catalyst is selected from at least one of platinum-supported foam metal, platinum alloy-supported foam metal, nickel phosphide-supported foam metal, and cobalt phosphide-supported foam metal.

Further, a palladium alloy is selected from at least one of a palladium-nickel alloy, a palladium-ruthenium alloy, a palladium-platinum alloy and a palladium-iridium alloy in the above method; and a platinum alloy is selected from at least one of a platinum-iridium alloy, a platinum-nickel alloy and a platinum-ruthenium alloy.

In the anode catalyst, a material supported on per square centimeter of foam metal has a total amount ranging from 1 mg to 10 mg; and in the cathode catalyst, a material supported on per square centimeter of foam metal has a total amount ranging from 0.2 mg to 2 mg when the cathode catalyst is the supported catalyst.

In the anode catalyst or the cathode catalyst, the foam metal is selected from at least one of foam nickel, foam copper, foam iron and foam cobalt separately, and is preferably the foam nickel.

A molar concentration ratio of the ethylene glycol to alkali is 1:1 to 1:5 in the alkaline electrolyte containing the ethylene glycol.

The alkali is potassium hydroxide or sodium hydroxide, and is more preferably sodium hydroxide.

The applied voltage ranges from 0.5 V to 1.5 V.

The waste plastic PET is bottle grade PET, film grade PET or fiber grade PET.

After the electrocatalytic reaction, the method further includes an operation of separating and purifying the glycollate, and the operation specifically includes: carrying out color removal through activated carbon, drying, washing, dissolution and filtering, and recrystallization on an electrolyzed solution to obtain separated and purified glycollate; and preferably, a washing liquid for washing is at least one of dichloromethane, methanol, ethanol and water.

In addition, unless otherwise specified, any range described in the present invention includes end values, any value between the end values, and any sub-range formed by the end values or any value between the end values. In the present invention, the preparation methods are both conventional methods unless otherwise specified, the raw materials used can be obtained from public commercial channels or prepared according to the prior art unless otherwise specified, the percentages are mass percentages unless otherwise specified, and the solutions are aqueous solutions unless otherwise specified.

The present invention has the following beneficial effects:
1. The method for preparing glycollate by electro-catalyzing ethylene glycol according to the present invention converts the ethylene glycol into the glycollate by means of an electrocatalysis technology under the action of specific anodic oxidation, thereby solving the problem of highly toxic raw materials for industrial production of glycolic acid.
2. The method for preparing glycollate by electro-catalytically reforming waste plastic PET according to the present invention converts the waste plastic PET into a high value-added product glycollate through a specific catalyst as an electrode, thereby not only utilizing resources and energy of the waste plastic PET, but also providing a new idea for low-cost and large-scale production of glycolic acid. Compared with a conventional industrial method for recycling waste plastic PET, the method according to the present invention can bring greater economic benefits and is more suitable for industrialization and large-scale popularization.
3. According to the two methods for preparing glycollate provided in the present invention, the product glycollate has purity of 98% or above, and a recycle rate of about 40%-81%; and a product hydrogen has Faradaic efficiency of 99% or above, and a recycle rate of 99% or above.

BRIEF DESCRIPTION OF THE SEVERAL VIEWS OF THE DRAWINGS

In order to describe the technical solutions in the examples of the present invention more clearly, the accompanying drawings required for describing the examples are briefly described below. Obviously, the accompanying drawings in the following description show merely some examples of the present invention, and those of ordinary skill in the art would further be able to derive other accompanying drawings from these accompanying drawings without creative efforts.

DETAILED DESCRIPTION OF THE INVENTION

Figure 1:
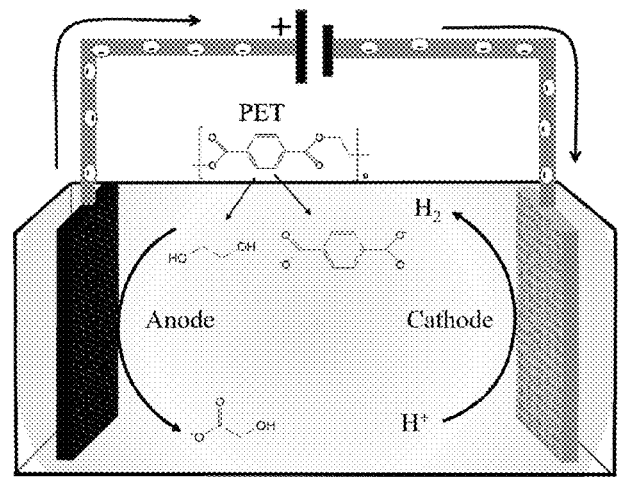
FIG. 1 shows a schematic diagram of a reaction flow of preparing glycollate by electro-catalytically reforming waste plastic polyethylene terephthalate (PET) according to the present invention.

In order to further understand the present invention, the preferred implementations of the present invention will be described below in conjunction with the examples. However, it should be understood that these descriptions are only intended to further describe the features and advantages of the present invention and not to limit the patent requirements of the present invention.

All raw materials of the present invention have no special limitation to purity of the raw materials, and the analytically pure purity requirement is preferably used in the present invention.

Sources and abbreviations of all raw materials of the present invention all belong to conventional sources and abbreviations in the art, and are clearly defined in the field of related uses of the raw materials. Those skilled in the art can purchase the raw materials from the market or prepare the raw materials by using conventional methods according to the abbreviations and corresponding uses of the raw materials.

In a first aspect, the present invention provides a method for preparing glycollate by electro-catalyzing ethylene glycol. The method includes:
assemble an anode catalyst, a cathode catalyst and an alkaline electrolyte containing the ethylene glycol into an electrolytic cell, and apply voltage for electrocatalytic reaction, where the ethylene glycol is oxidized at an anode to generate the glycollate, and water is reduced at a cathode to generate hydrogen;
the anode catalyst is selected from at least one of palladium-supported foam metal, palladium alloy-supported foam metal, platinum-supported foam metal, and platinum alloy-supported foam metal; and
the cathode catalyst is foam metal and/or a supported catalyst; and the supported catalyst is selected from at least one of platinum-supported foam metal, platinum alloy-supported foam metal, nickel phosphide-supported foam metal, and cobalt phosphide-supported foam metal.

It should bee noted that the present invention converts the ethylene glycol into the glycollate by means of an electro-catalysis technology under the action of anodic oxidation, thereby solving the problem of highly toxic raw materials for industrial production of glycolic acid.

Preferably, when the anode catalyst is selected from the palladium-supported foam metal, the product glycollate has a higher recycle rate.

Exemplarily, in the anode catalyst, a material supported on per square centimeter of foam metal has a total amount ranging from 1 mg to 10 mg: preferably, a material supported on per square centimeter of foam metal has a total amount ranging from 4 mg to 8 mg, and more preferably, a material supported on per square centimeter of foam metal has a total amount ranging from 5 mg to 6 mg.

In the cathode catalyst, a material supported on per square centimeter of foam metal has a total amount ranging from 0.2 mg to 2 mg when the cathode catalyst is the supported catalyst.

Those in the art may understand that in the anode catalyst, the material supported on the foam metal is at least one of palladium, a palladium alloy, platinum and a platinum alloy, and in the cathode catalyst, the material supported on the foam metal is at least one of nickel phosphide, cobalt phosphide, platinum or a platinum alloy. The shape of the foam metal may be adjusted and selected by those skilled in the art according to actual conditions. In addition, a support amount of the material supported in the foam metal is in the scope of the present invention, and the obtained catalyst has a larger electrochemical active surface area.

A molar concentration ratio of the ethylene glycol to alkali is 1:1 to 1:5 in the alkaline electrolyte containing the ethylene glycol.

The alkali is potassium hydroxide or sodium hydroxide, and is more preferably sodium hydroxide. When the alkali is sodium hydroxide, separation and purification of the product are facilitated.

Exemplarily, a method for preparing the anode catalyst includes:
immerse foam metal into a palladium salt solution for stirring to obtain the anode catalyst.

The palladium salt solution has a concentration ranging from 20 mmol/L to 40 mmol/L; and preferably, the palladium salt solution has a concentration ranging from 25 mmol/L to 35 mmol/L.

The stirring has time ranging from 5 min to 60 min.

Palladium salt includes, but not limited to, $PdCl_2$, $Pd(NO_3)_2$, $Pd(SO_4)_2$, $H_2PdCl_4$, etc.; due to an oxidation-reduction potential difference between palladium ions and metal nickel ions, displacement reaction may occur to the palladium ions and metal nickel. For example, due to the oxidation-reduction potential difference between $[PdCl_4]^{2-}$ and $Ni^{2+}$, ($Ni^{2+}+2e=Ni$ −0.246 V vs RHE, $[PdCl_4]^{2-}+2e=Pd+4Cl^-$ 0.62 V vs RHE), displacement reaction may occur to $[PdCl_4]^{2-}$ and the metal nickel. After a certain reaction time, $[PdCl_4]^{2-}$ in the solution may be reduced and loaded on a surface of the metal nickel foam, thereby preparing the anode catalyst.

Exemplarily, a method for preparing the cathode catalyst includes:
immerse foam metal into a platinum salt solution to obtain the cathode catalyst.

The platinum salt solution has a concentration ranging from 0.5 mmol/L to 2 mmol/L.

The immersion has time ranging from 5 h to 24 h.

Platinum salt includes, but not limited to, $K_2PtCl_4$, $K_2PtCl_6$, $H_2PtCl_4$, $H_2PtCl_6$, etc.; due to an oxidation-reduction potential difference between platinum ions and metal nickel ions, displacement reaction may occur to the platinum ions and metal nickel. For example, due to the oxidation-reduction potential difference between $[PtCl_4]^{2-}$ and $Ni^{2+}$, ($Ni^{2+}+2e=Ni$ −0.246 V vs RHE; $[PtCl_4]^{2-}+2e=Pt+4Cl^-$ 0.73 V vs RHE), displacement reaction may occur to $[PtCl_4]^{2-}$ and the metal nickel. After a certain reaction time, $[PtCl_4]^{2-}$ in the solution may be reduced and loaded on a surface of the metal nickel foam, thereby preparing the cathode catalyst.

Exemplarily, the method further includes recycle of the glycollate and hydrogen generated.

The hydrogen is directly collected as a gas.

Separation and purification of the glycollate includes: carry out color removal through activated carbon, drying, washing, dissolution and filtering, and recrystallization on an electrolyzed solution (electrolyte containing glycollate) to obtain separated and purified glycollate. An operation of separation and purification of the present invention can not only effectively separate the glycollate from a reacted electrolyte, but also obtain the glycollate having high purity, such that the glycollate is directly used for industrial production of glycolic acid without other purification and other processing.

Preferably, a washing liquid for washing is at least one of dichloromethane, methanol, ethanol and water. When the washing liquid is ethanol, the obtained glycollate has higher purity.

Exemplarily, separation and purification of the glycollate specifically includes: remove color of the electrolyzed solution through activated carbon (a treatment mode may be heating reflux, a temperature is 60° C. to 120° C., and time is 1 h to 6 h); heat and evaporate the solution after color removal to remove all water to obtain white solid powder; ultrasonically clean the white solid powder with 95% ethanol solution (ultrasonic power is 100 W to 1000 W, and ultrasonic time is 10 min to 60 min), and filter the solution to obtain white solid powder; dissolve the white solid powder with an appropriate amount of water, and filter an insoluble matter in the solution to obtain a colorless clear solution; and recrystallize the colorless clear solution (a treatment mode is to add the colorless clear solution into 95% ethanol solution, and control a temperature at 10° C. to 20° C.), crystallize sodium glycollate out after 1 h to 4 h, and filter a crystal to separate and purify the sodium glycollate.

In a second aspect, the present invention provides a method for preparing glycollate by electro-catalytically reforming waste plastic polyethylene terephthalate (PET). The method includes:
1) dissolve the waste plastic PET into an alkali liquid, and carry out solid-liquid separation after hydrolysis reaction to obtain an alkaline electrolyte containing ethylene glycol; and
2) assemble an anode catalyst, a cathode catalyst and the alkaline electrolyte containing the ethylene glycol into an electrolytic cell, and apply voltage for electrocatalytic reaction, where the ethylene glycol is oxidized at an anode to generate glycollate, and water is reduced at a cathode to generate hydrogen;
the anode catalyst is selected from at least one of palladium-supported foam metal, palladium alloy-supported foam metal, platinum-supported foam metal, and platinum alloy-supported foam metal; and
the cathode catalyst is foam metal and/or a supported catalyst; and the supported catalyst is selected from at least one of platinum-supported foam metal, platinum alloy-supported foam metal, nickel phosphide-supported foam metal, and cobalt phosphide-supported foam metal.

It should be noted that the present invention electro-catalytically reforms the waste plastic PET to prepare a high value-added product glycollate firstly through a specific catalyst as an electrode. The method not only utilizes resources and energy of the waste plastic PET, but also provides a new idea for low-cost and large-scale production of glycolic acid.

In step 1), the waste plastic PET is dissolved into the alkali liquid, after a period of time, the PET is hydrolyzed into terephthalate and ethylene glycol, and a solid product terephthalate is filtered and separated to obtain the alkaline electrolyte containing the ethylene glycol; and in step 2), the voltage is applied to the alkaline electrolyte containing the ethylene glycol obtained above for electrocatalytic reaction according to the method of the present invention, so as to finally obtain the electrolyte containing the glycollate and the hydrogen (see FIG. 1 for the schematic diagram of a reaction flow).

Exemplarily, a method for preparing the anode catalyst includes:
immerse foam metal into a palladium salt solution for stirring to obtain the anode catalyst.

The palladium salt solution has a concentration ranging from 20 mmol/L to 40 mmol/L; and preferably, the palladium salt solution has a concentration ranging from 25 mmol/L to 35 mmol/L.

The stirring has time ranging from 5 min to 60 min.

Palladium salt includes, but not limited to, $PdCl_2$, $Pd(NO_3)_2$, $Pd(SO_4)_2$, $H_2PdCl_4$, etc.; due to an oxidation-reduction potential difference between palladium ions and metal nickel ions, displacement reaction may occur to the palladium ions and metal nickel. For example, due to the oxidation-reduction potential difference between $[PdCl_4]^{2-}$ and $Ni^{2+}$, ($Ni^{2+}+2e=Ni$ $-0.246$ V vs RHE; $[PdCl_4]^{2-}+2e=Pd+4Cl^-$ 0.62 V vs RHE), displacement reaction may occur to $[PdCl_4]^{2-}$ and the metal nickel. After a certain reaction time, $[PdCl_4]^{2-}$ in the solution may be reduced and loaded on a surface of the metal nickel foam, thereby preparing the anode catalyst.

Exemplarily, a method for preparing the cathode catalyst includes:
immerse foam metal into a platinum salt solution to obtain the cathode catalyst.

The platinum salt solution has a concentration ranging from 0.5 mmol/L to 2 mmol/L.

The immersion has time ranging from 5 h to 24 h.

Platinum salt includes, but not limited to, $K_2PtCl_4$, $K_2PtCl_6$, $H_2PtCl_4$, $H_2PtCl_6$, etc.; due to an oxidation-reduction potential difference between platinum ions and metal nickel ions, displacement reaction may occur to the platinum ions and metal nickel. For example, due to the oxidation-reduction potential difference between $[PtCl_4]^{2-}$ and $Ni^{2+}$, ($Ni^{2+}+2e=Ni$ $-0.246$ V vs RHE; $[PtCl_4]^{2-}+2e=Pt+4Cl^-$ 0.73 V vs RHE), displacement reaction may occur to $[PtCl_4]^{2-}$ and the metal nickel. After a certain reaction time, $[PtCl_4]^{2-}$ in the solution may be reduced and loaded on a surface of the metal nickel foam, thereby preparing the cathode catalyst.

Exemplarily, the method further includes recycle of the glycollate and hydrogen generated.

The hydrogen is directly collected as a gas.

Separation and purification of the glycollate includes: carry out color removal through activated carbon, drying, washing, dissolution and filtering, and recrystallization on an electrolyzed solution (electrolyte containing glycollate) to obtain separated and purified glycollate. An operation of separation and purification of the present invention can not only effectively separate the glycollate from a reacted electrolyte, but also obtain the glycollate having high purity, such that the glycollate is directly used for industrial production of glycolic acid without other purification and other processing.

Preferably, a washing liquid for washing is at least one of dichloromethane, methanol, ethanol and water. When the washing liquid is ethanol, the obtained glycollate has higher purity.

Exemplarily, separation and purification of the glycollate specifically includes: remove color of the electrolyzed solution through activated carbon (a treatment mode may be heating reflux, a temperature is 60° C. to 120° C., and time is 1 h to 6 h); heat and evaporate the solution after color removal to remove all water to obtain white solid powder; ultrasonically clean the white solid powder with 95% ethanol solution (ultrasonic power is 100 W to 1000 W, and ultrasonic time is 10 min to 60 min), and filter the solution to obtain white solid powder; dissolve the white solid powder with an appropriate amount of water, and filter an insoluble matter in the solution to obtain a colorless clear solution; and recrystallize the colorless clear solution (a treatment mode is to add the colorless clear solution into 95% ethanol solution, and control a temperature at 10° C. to 20° C.), crystallize sodium glycollate out after 1 h to 4 h, and filter a crystal to separate and purify the sodium glycollate.

Exemplarily, in step 1), the alkali liquid has a concentration of 10 mol/L, and the hydrolysis reaction is heated and refluxed at 50° C. to 100° C. for 5 h to 20 h.

The waste plastic PET generally refers to a plastic product mainly made of the PET, and includes bottle grade PET, film grade PET or fiber grade PET.

The present invention has no particular limitation to time of the electrocatalytic reaction, and those skilled in the art can qualitatively or quantitatively analyze an electrolysis product glycollate according to a 1H NMR spectrum, gas chromatography, a weighing method or an x-ray diffraction (XRD) spectrum, so as to determine a progress and completion time of the reaction.

A recycle rate in the following examples is calculated as: recycle rate %=actual yield of product/theoretical yield of product*100%.

Example 1

A method for preparing glycollate by electro-catalytically reforming waste plastic PET included:

1. Preparation of an Electrode Material (1) Metal nickel foam having a size of 1 cm×2 cm was immersed into 4 mL of $H_2PdCl_4$ solution (which had a concentration of 30 mmol/L), and was stirred at a room temperature for 10 minutes, replacement reaction was completed, and then the nickel foam was taken out to successfully prepare a palladium-supported foam metal electrode (Pd—Ni foam catalyst), where palladium had a support amount of about 6 mg/cm².

(2) Metal nickel foam having a size of 1 cm×2 cm was immersed into 10 mL of $K_2PtCl_4$ solution (which had a concentration of 1 mmol/L), and was left to stand at a room temperature for 12 hours, replacement reaction was completed, and then the nickel foam was taken out to successfully prepare a platinum supported foam metal electrode (Pt—Ni foam catalyst), where platinum had a support amount of about 1 mg/cm².

2. Hydrolysis of PET 10 g of waste plastic PET was added into a NaOH solution (the NaOH solution had a volume of 50 mL and a concentration of 10 mol/L), and was heated and refluxed in a range of 50° C. to 100° C., where reflux time was 5 h to 20 h. Reflux reaction was completed, and then a solid product of sodium terephthalate was separated and filtered to obtain a NaOH solution containing ethylene glycol.

3. Configuration of an Electrolyte

The NaOH solution containing the ethylene glycol obtained above was heated and evaporated to precipitate NaOH in the solution, and NaOH solid was filtered. Then, a filtered part of NaOH was added into filtrate to make the ethylene glycol in the filtrate have a concentration of 1.1 M and NaOH having a concentration of 2 M, which was used as the electrolyte.

Figure 2:
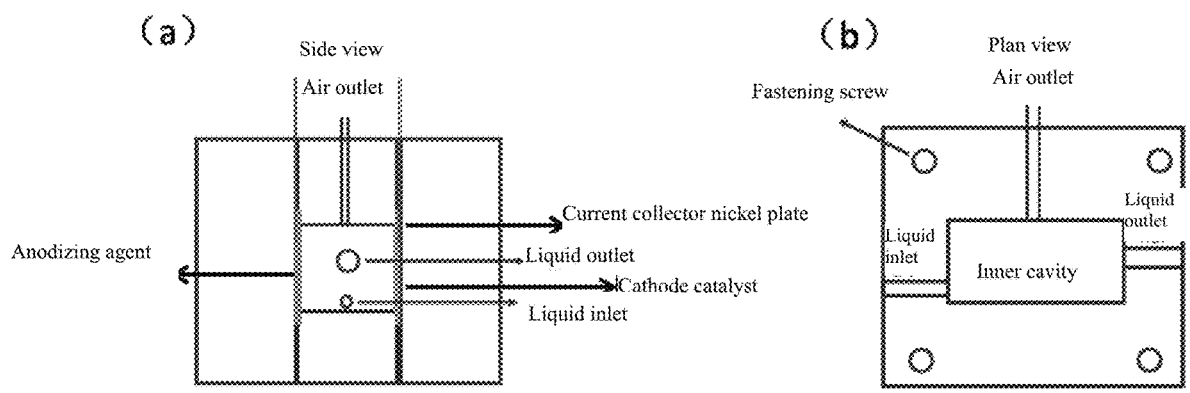
FIG. 2 shows a schematic structural diagram of a flow electrolytic cell of Example 1, where (a) shows a side view of the flow electrolytic cell of Example 1, and (b) shows a plan view of the flow electrolytic cell of Example 1.
Figure 3:
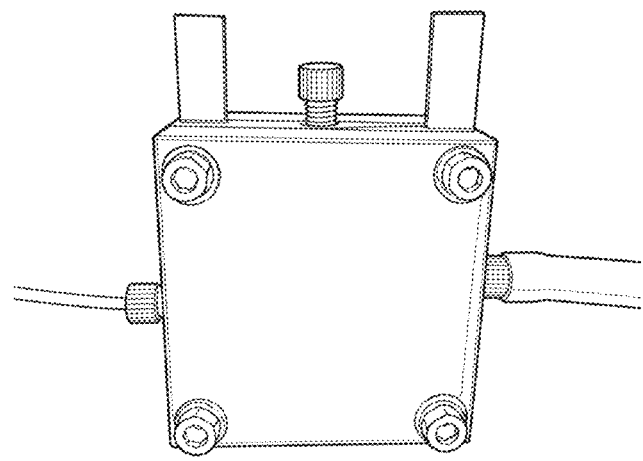
FIG. 3 shows a schematic physical diagram of the flow electrolytic cell of Example 1.

4. Flow Electrolysis of the Electrolyte the electrolyte was electrolyzed by using the Pd—Ni foam catalyst as an anode catalyst (preparation conditions were as follows: $H_2PdCl_4$ had a concentration of 30 mM, and a volume of 4 mL), the Pt—Ni foam catalyst as a cathode catalyst (preparation conditions were as follows: $K_2PtCl_4$ had a concentration of 1 mM, and a volume of 10 mL) and a flow electrolysis process (see FIGS. 2-3 for a flow electrolytic cell), the electrolyte had a volume of 100 mL, a cell pressure was controlled at 0.9 V-1.1 V, and a flow rate of the electrolyte was controlled at 0.1 mL/min-0.3 mL/min (an i-t curve during flow electrolysis of an electrolyte was shown in FIG. 10).

5. Separation and Purification of Sodium Glycollate

Figure 11:
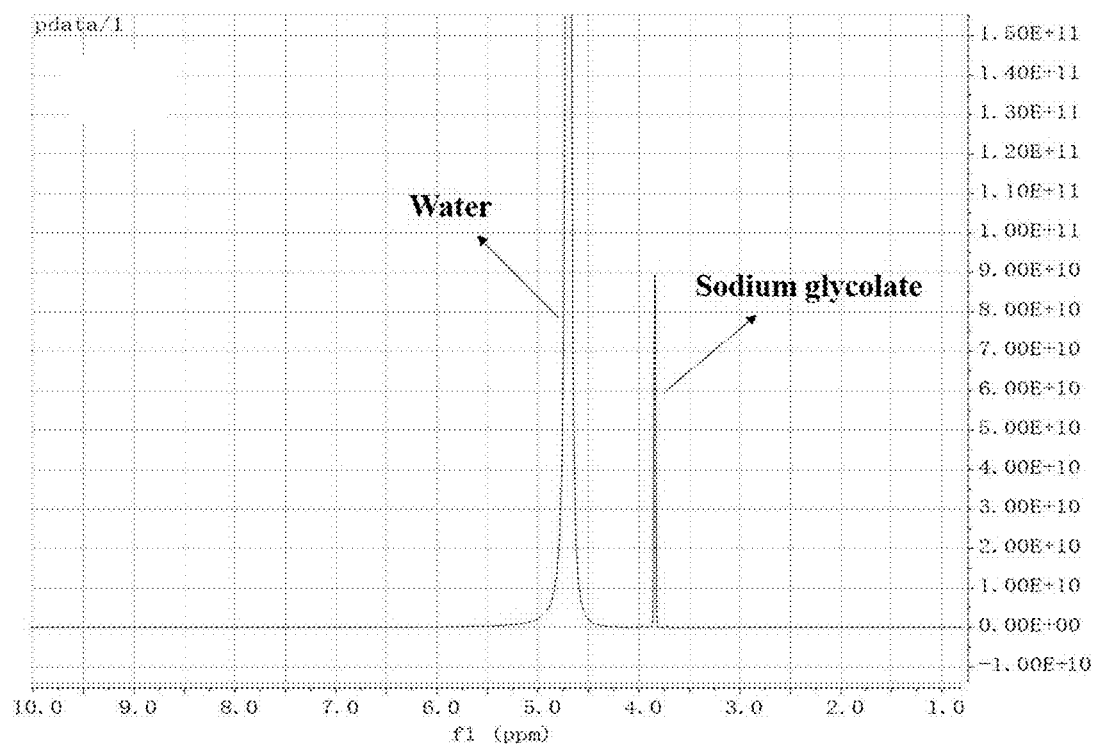
FIG. 11 shows a 1 hydrogen nuclear magnetic resonance (HNMR) spectrum of a product sodium glycollate obtained in Example 1.
Figure 12:
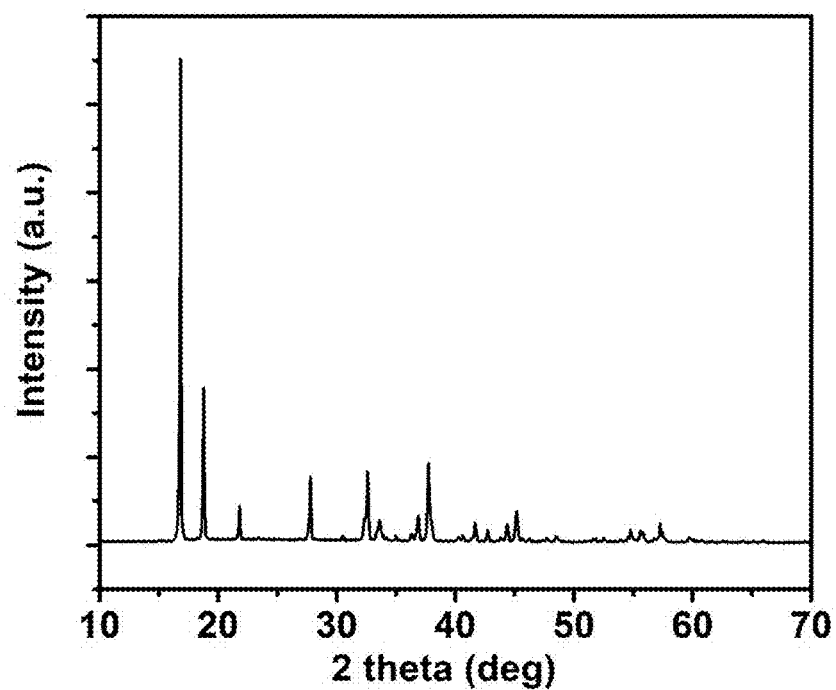
FIG. 12 shows an XRD spectrum of the product sodium glycollate obtained in Example 1.

Electrolysis was completed, then color of the obtained solution was removed through activated carbon (a treatment mode may be heating reflux, a temperature was 90° C., and time was 3 h); the solution was heated and evaporated after color removal to remove all water to obtain white solid powder: the white solid powder was ultrasonically cleaned with 95% ethanol solution (ultrasonic power was 100 W to 1000 W, and ultrasonic time was 10 min to 60 min), and the solution was filtered to obtain white solid powder: the white solid powder was dissolved with an appropriate amount of water, and an insoluble matter in the solution was filtered to obtain a colorless clear solution; the colorless clear solution was recrystallized (a treatment mode was to add the colorless clear solution into 95% ethanol solution, and control a temperature at 10° C. to 20° C.), sodium glycollate was crystallized out after 1 h to 4 h, and a crystal was filtered to obtain a product, so as to separate and purify the sodium glycollate (a 1 hydrogen nuclear magnetic resonance ($^1$HNMR) spectrum of the separated and purified sodium glycollate was shown in FIG. 11, and an XRD spectrum of the separated and purified sodium glycollate was shown in FIG. 12).

6. Qualitative and Quantitative Analysis of the Sodium Glycollate and Hydrogen

Figure 13:
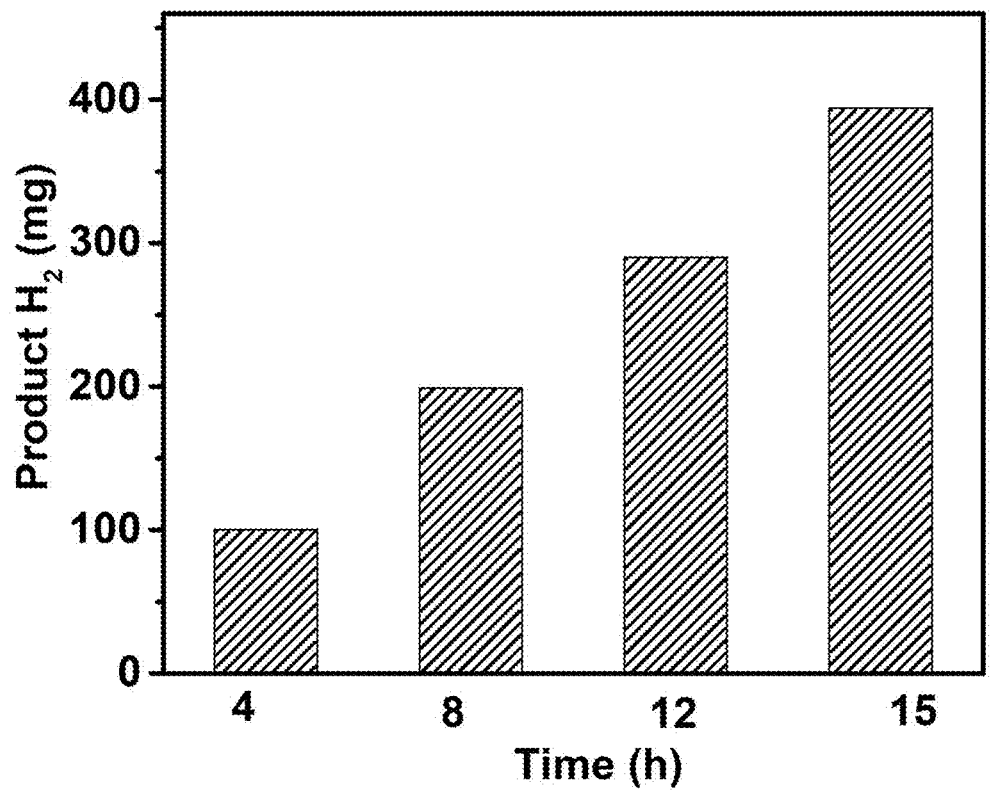
FIG. 13 shows a graph of generation of a product hydrogen at different electrolysis time during flow electrolysis of Example 1.

The product sodium glycollate was qualitatively and quantitatively analyzed by means of an aqueous nuclear magnetic resonance 1H spectrum, XRD and a weighing method; and hydrogen was qualitatively and quantitatively analyzed by means of gas chromatography and a drainage gas collection method (during electrolysis of 15 h, formation of the product hydrogen was shown in FIG. 13).

A recycle rate of separated and purified sodium glycollate in the example was calculated to reach 81% or above.

Figure 4:
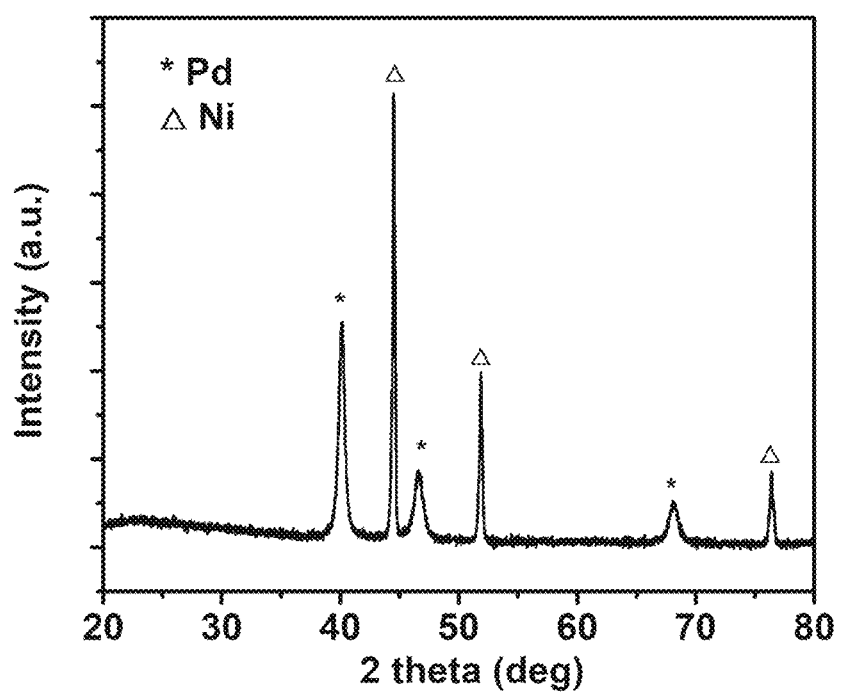
FIG. 4 shows an x-ray diffraction (XRD) spectrum of a Pd—Ni foam catalyst prepared in Example 1.

It may be seen from FIG. 4 that the Pd—Ni foam anode catalyst may be successfully prepared in the example.

Figure 5:
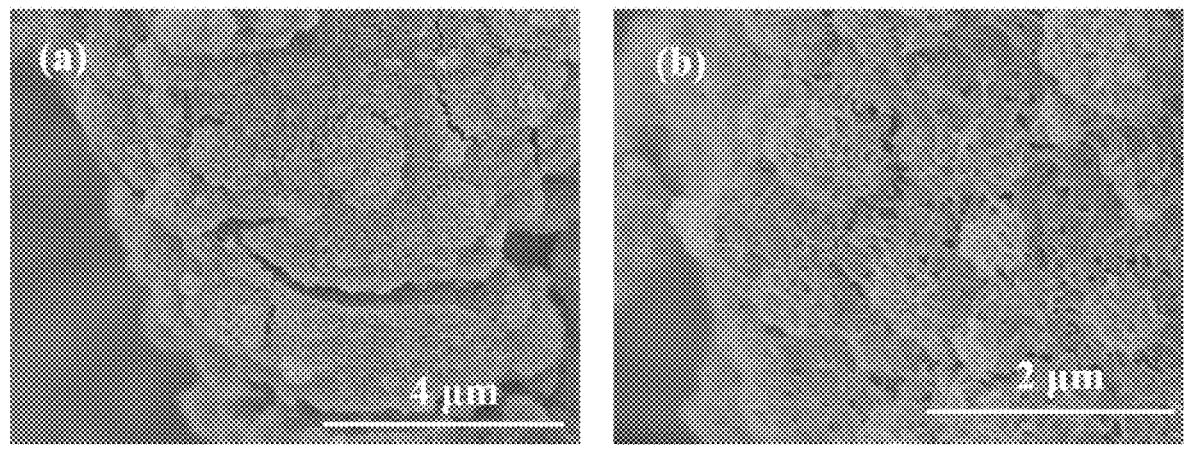
FIG. 5 shows a microstructure image of the Pd—Ni foam catalyst prepared in Example 1, where (a) shows a scanning electron microscope (SEM) image of the Pd—Ni foam catalyst prepared in Example 1 on a 4 μm scale, and (b) shows an SEM image of the Pd—Ni foam catalyst prepared in Example 1 on a 2 μm scale.

It may be seen from FIG. 5 that morphology of the Pd—Ni foam catalyst prepared in the example was a nanosheet.

Figure 6:
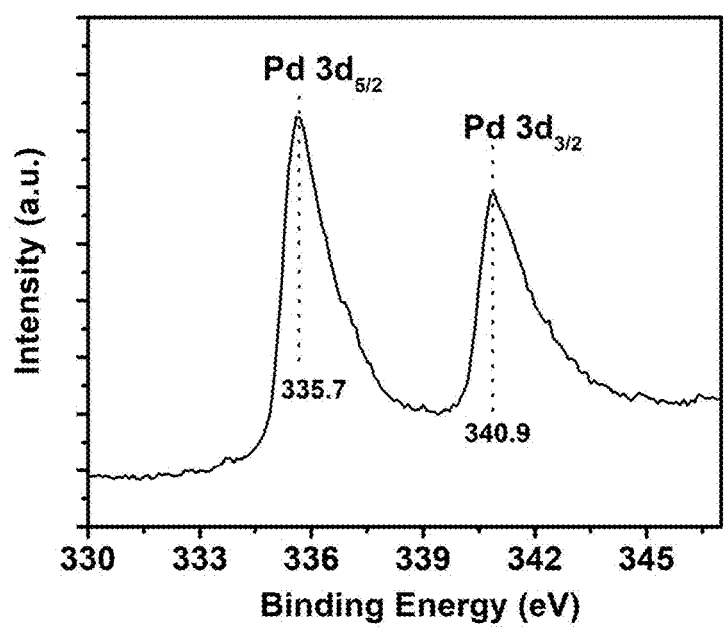
FIG. 6 shows an x-ray photoelectron spectroscopy (XPS) spectrum of the Pd—Ni foam catalyst prepared in Example 1.

It may be seen from FIG. 6 that binding energy of $Pd3d_{5/2}$ and $Pd3d_{3/2}$ in the Pd—Ni foam catalyst prepared in the example was 335.7 eV and 340.9 eV separately, and therefore a palladium element was mainly supported on a surface of the nickel foam in a form of $Pd^0$ (zero valence state).

Figure 7:
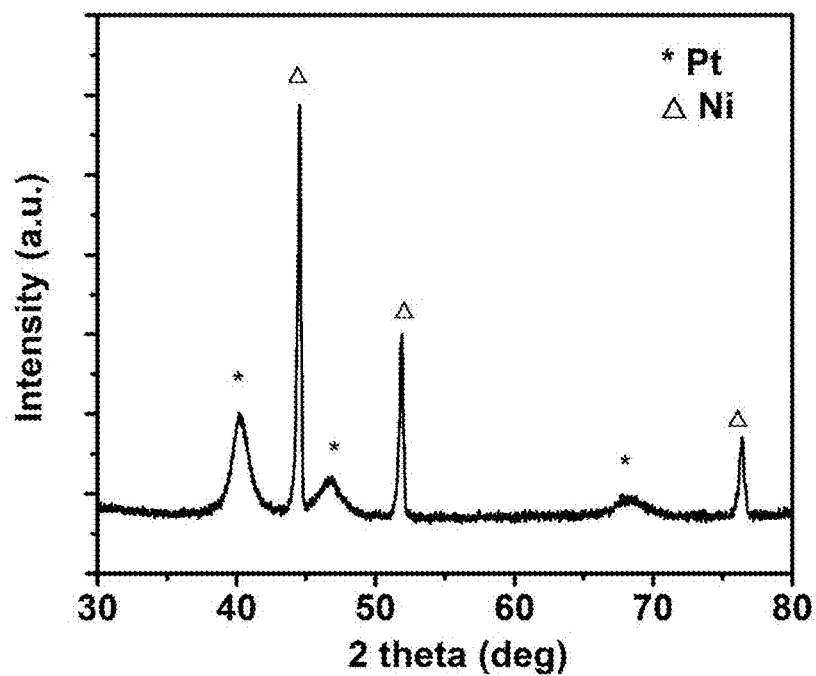
FIG. 7 shows an XRD spectrum of a Pt—Ni foam catalyst prepared in Example 1.

It may be seen from FIG. 7 that a Pt—Ni foam cathode catalyst may be successfully prepared in the example.

Figure 8:
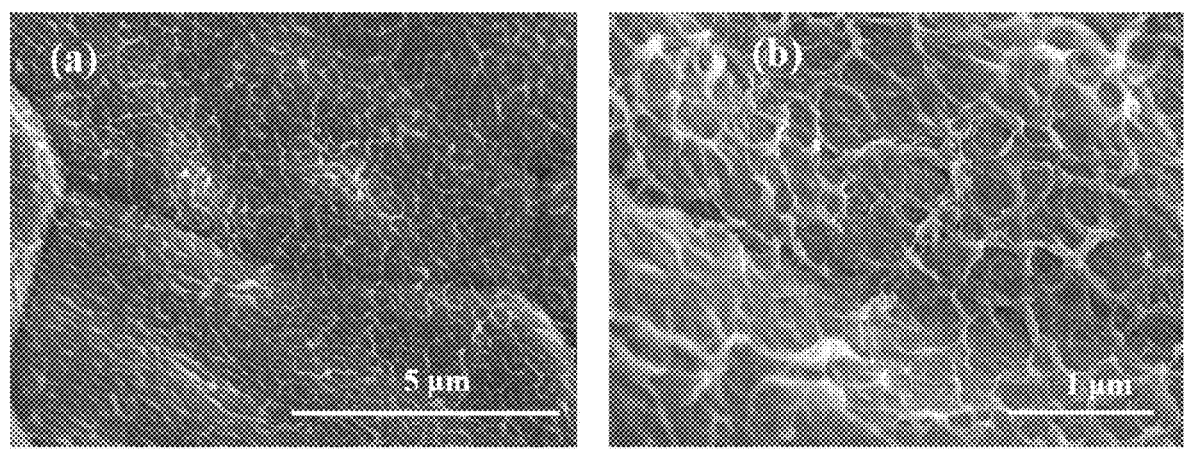
FIG. 8 shows an SEM image of the Pt—Ni foam catalyst prepared in Example 1, where (a) shows an SEM image of the Pt—Ni foam catalyst prepared in Example 1 on a 5 μm scale, and (b) shows an SEM image of the Pt—Ni foam catalyst prepared in Example 1 on a 1 μm scale.

It may be seen from FIG. 8 that morphology of the Pt—Ni foam catalyst prepared in the example was a nanosheet.

Figure 9:
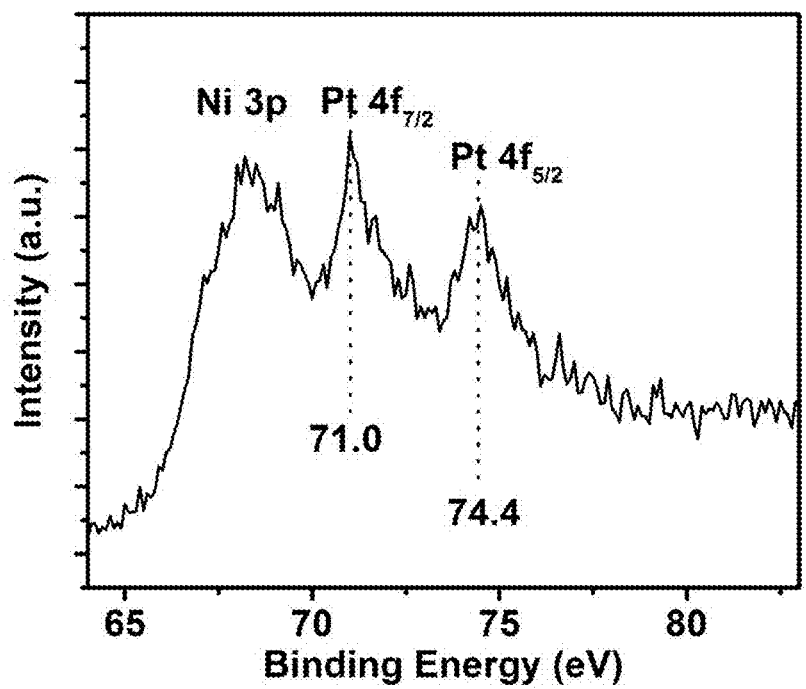
FIG. 9 shows an XPS spectrum of the Pt—Ni foam catalyst prepared in Example 1.

It may be seen from FIG. 9 that binding energy of $Pt4f_{7/2}$ and $Pt4f_{5/2}$ in the Pt—Ni foam catalyst prepared in the example was 71.0 eV and 74.4 eV separately, and therefore a platinum element was mainly supported on the surface of the nickel foam in a form of $Pt^0$ (zero valence state).

Figure 10:
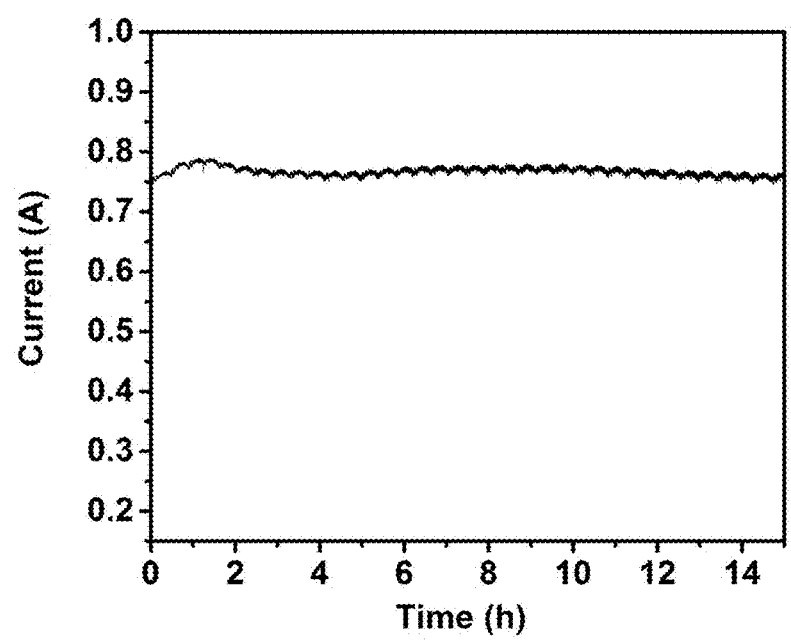
FIG. 10 shows an i-t curve during flow electrolysis of an electrolyte of Example 1.

It may be seen from FIG. 10 that electrocatalytic activity was stable during flow electrolysis by using the Pd—Ni foam as the anode catalyst and the Pt—Ni foam as the cathode catalyst, and may reach 380 $mA/cm^2$.

It may be seen from FIG. 11 that separated and purified sodium glycollate had purity of 98% or above.

As can be seen from FIG. 12, separated and purified sodium glycollate was well-crystallized.

It may be seen from FIG. 13 that during flow electrolysis of 15 h, hydrogen produced by a cathode was gradually increased with extension of electrolysis time. Within 15 h, 394 mg of hydrogen may be produced, and the hydrogen had Faradaic efficiency reaching 99%, and a recycle rate reaching 99%.

Example 2

A method for preparing glycollate by electro-catalytically reforming waste plastic PET had the same operation as Example 1, and the difference only lied in that in preparation of an electrode material in step 1, preparation conditions of a Pd—Ni foam catalyst were as follows: $H_2PdCl_4$ had a concentration of 20 mM, and a volume of 4 mL (palladium had a support amount of about 4 $mg/cm^2$ in the Pd—Ni foam catalyst).

A recycle rate of separated and purified sodium glycollate in the example was calculated to reach 40% or above.

Figure 14:
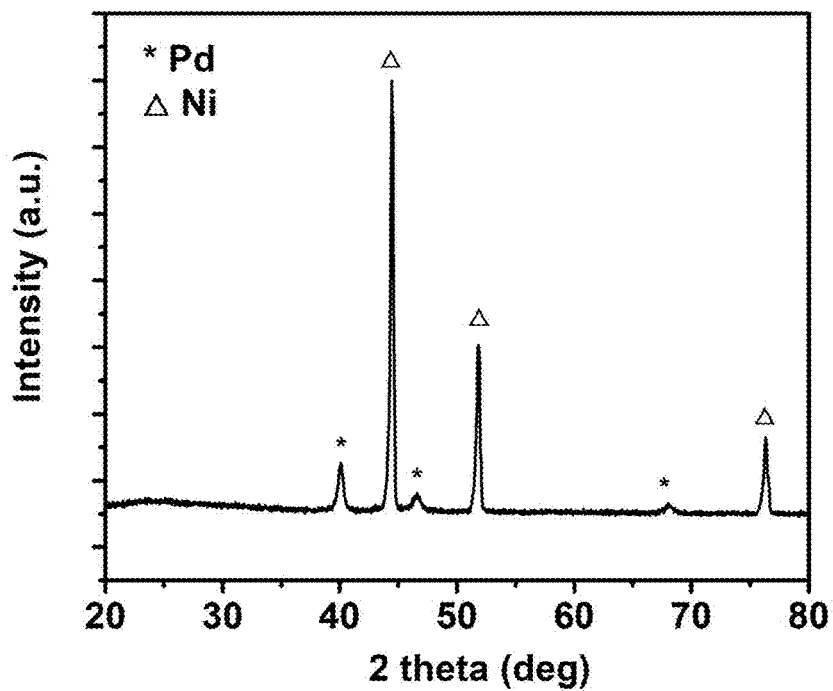
FIG. 14 shows an XRD spectrum of a Pd—Ni foam catalyst prepared in Example 2.

It may be seen from FIG. 14 that a Pd—Ni foam catalyst may be successfully prepared in the example.

Figure 15:
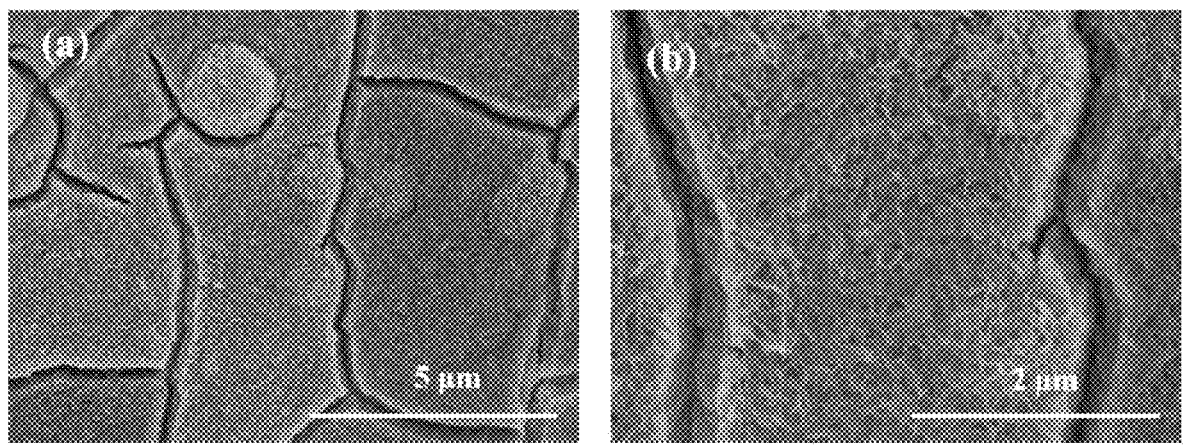
FIG. 15 shows a microstructure image of the Pd—Ni foam catalyst prepared in Example 2, where (a) shows an SEM image of the Pd—Ni foam catalyst prepared in Example 2 on a 5 µm scale, and (b) shows an SEM image of the Pd—Ni foam catalyst prepared in Example 2 on a 2 µm scale.

It may be seen from FIG. 15 that morphology of a Pd—Ni foam catalyst prepared in the example is a nanosheet.

Figure 16:
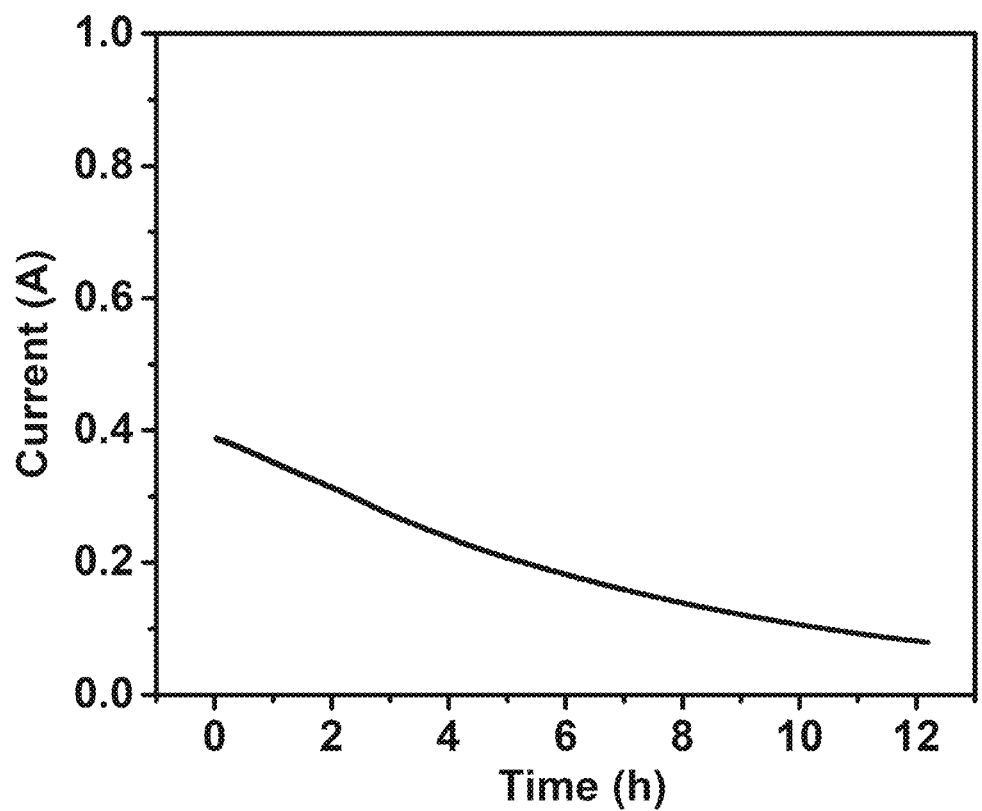
FIG. 16 shows an i-t curve during flow electrolysis of an electrolyte of Example 2.

It may be seen from FIG. 16 that initial catalytic performance was the highest during flow electrolysis by using Pd—Ni foam as an anode catalyst and Pt—Ni foam as a cathode catalyst, and was 195 $mA/cm^2$, but electrocatalytic activity was gradually reduced with extension of electrolysis time.

Example 3

A method for preparing glycollate by electro-catalytically reforming waste plastic PET had the same operation as Example 1, and the difference only lied in that in preparation of an electrode material in step 1, preparation conditions of a Pd—Ni foam catalyst were as follows: $H_2PdCl_4$ had a concentration of 40 mM, and a volume of 4 mL (palladium had a support amount of about 8 $mg/cm^2$ in the Pd—Ni foam catalyst).

A recycle rate of separated and purified sodium glycollate in the example was calculated to reach 50% or above.

Figure 17:
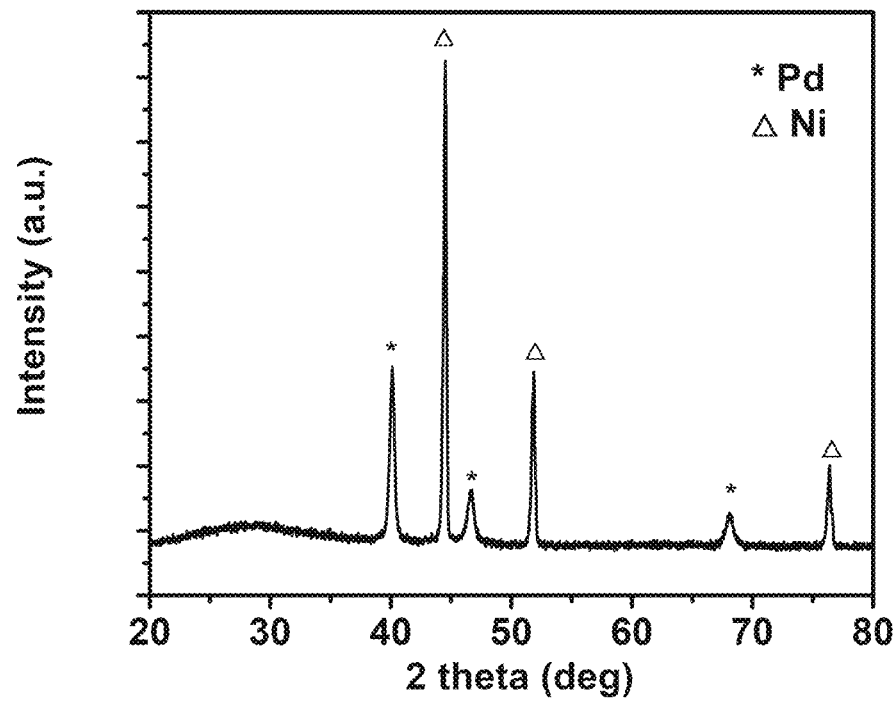
FIG. 17 shows an XRD spectrum of a Pd—Ni foam catalyst prepared in Example 3.

It may be seen from FIG. 17 that a Pt—Ni foam anode catalyst may be successfully prepared in the example.

Figure 18:
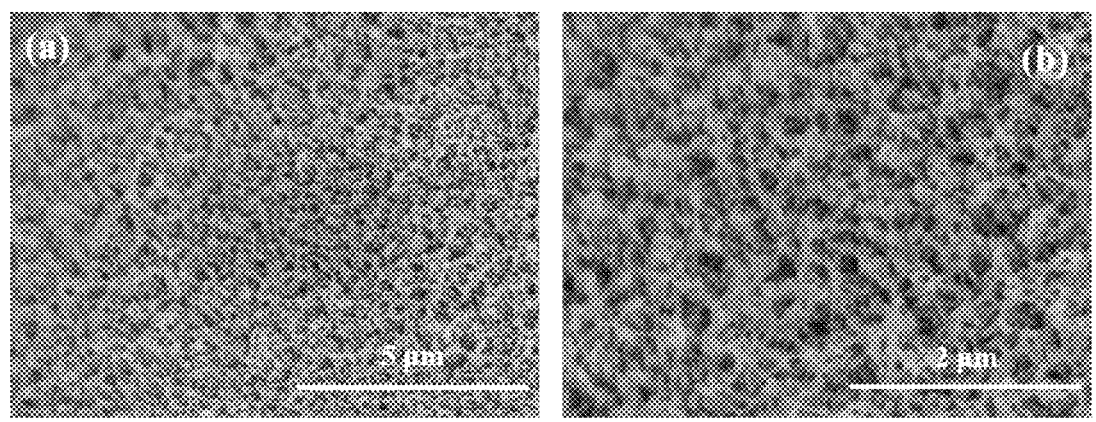
FIG. 18 shows a microstructure image of the Pd—Ni foam catalyst prepared in Example 3, where (a) shows an SEM image of the Pd—Ni foam catalyst prepared in Example 3 on a 5 µm scale, and (b) shows an SEM image of the Pd—Ni foam catalyst prepared in Example 3 on a 2 µm scale.

It may be seen from FIG. 18 that morphology of a Pd—Ni foam catalyst prepared in the example is nano-particles.

Figure 19:
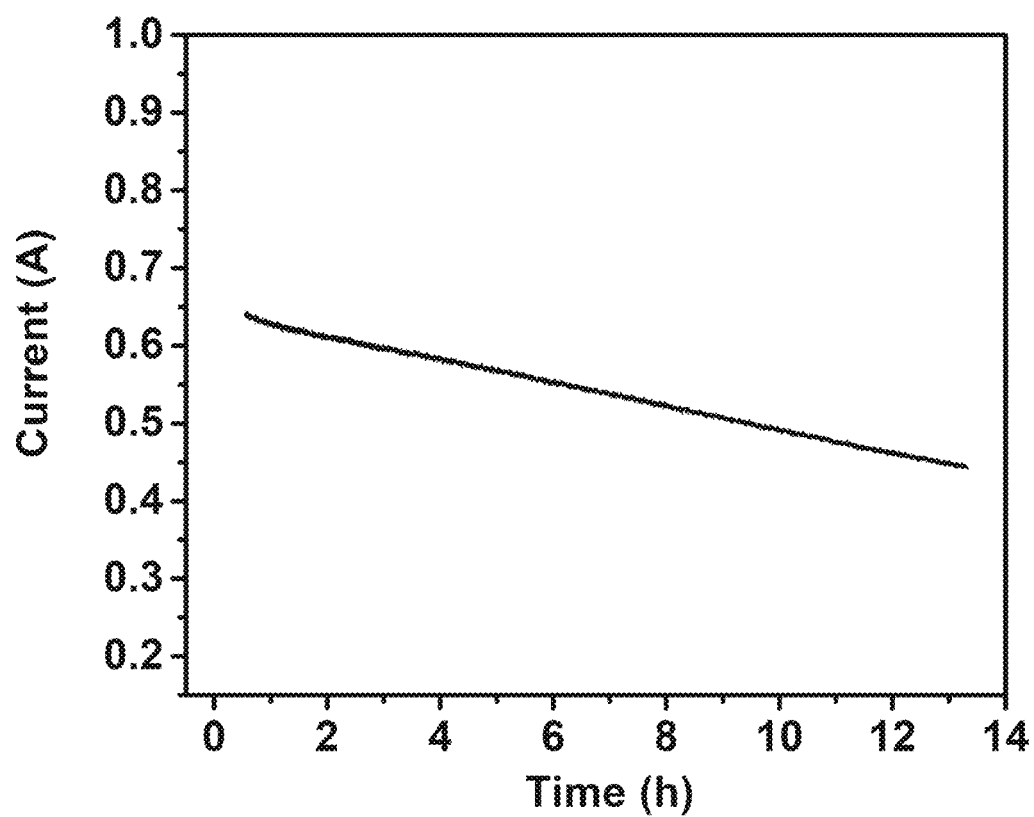
FIG. 19 shows an i-t curve during flow electrolysis of an electrolyte of Example 3.

It may be seen from FIG. 19 that initial catalytic performance was the highest during flow electrolysis by using Pd—Ni foam as an anode catalyst and Pt—Ni foam as a cathode catalyst, and was 320 $mA/cm^2$, but electrocatalytic activity was gradually reduced with extension of electrolysis time.

Example 4

A method for preparing glycollate by electro-catalytically reforming waste plastic PET had the same operation as Example 1. The difference only lied in that step 2 did not proceed, an electrolyte was directly prepared with ethylene glycol and a NaOH solution in step 3, and a molar concentration ratio of the ethylene glycol to NaOH in the electrolyte fell within a range of 1:1 to 1:5.

A recycle rate of separated and purified sodium glycollate in the example was calculated to reach 81% or above.

Qualitative and quantitative analysis results of the sodium glycollate and hydrogen were consistent with those of Example 1.

Example 5

A method for preparing glycollate by electro-catalytically reforming waste plastic PET had the same operation as Example 1. The difference only lied in that using foam nickel as a cathode catalyst and a cell pressure was controlled at 1.1 V-1.3 V.

A recycle rate of separated and purified sodium glycollate in the example was calculated to reach 81% or above.

Qualitative and quantitative analysis results of the sodium glycollate and hydrogen were consistent with those of Example 1.

Example 6

A method for preparing glycollate by electro-catalytically reforming waste plastic PET had the same operation as Example 1. The difference only lied in that using foam nickel supported by nickel phosphide as a cathode catalyst (nickel phosphide had a support amount of about 1 $mg/cm^2$) and a cell pressure was controlled at 1 V-1.2V.

A recycle rate of separated and purified sodium glycollate in the example was calculated to reach 81% or above.

Qualitative and quantitative analysis results of the sodium glycollate and hydrogen were consistent with those of Example 1.

Obviously, the above examples of the present invention are only for the purpose of clearly illustrating the present invention, rather than limiting the embodiments of the present invention. For those of ordinary skill in the pertinent field, other different forms of changes or modifications can further be made on the basis of the above description, and all the embodiments cannot be exhausted herein. Any obvious changes or modifications arising from the technical solution of the present invention still fall within the scope of protection of the present invention.

What is claimed is:

1. A method for preparing glycollate by electro-catalyzing ethylene glycol, comprising:

preparing an anode catalyst by immersing a nickel foam into a palladium salt solution while stirring for 5 minutes to 60 minutes, wherein the palladium salt solution has a concentration ranging from 20 mmol/L to 40 mmol/L, and the palladium salt is at least one selected from the group consisting of $PdCl_2$, $Pd(NO_3)_2$, $Pd(SO_4)_2$, and $H_2PdCl_4$;

assembling the anode catalyst, a cathode catalyst and an alkaline electrolyte containing the ethylene glycol into an electrolytic cell, and applying voltage for electrocatalytic reaction, wherein the ethylene glycol is oxidized at an anode to generate the glycollate, and water is reduced at a cathode to generate hydrogen;

the anode catalyst is palladium-supported nickel foam;

the anode catalyst is a nanosheet;

in the palladium-supported nickel foam, a palladium element is mainly supported on a surface of a nickel foam in a form of $Pd^0$ (zero valence state);

in the anode catalyst, the palladium element supported on per square centimeter of the nickel foam has a total amount ranging from 1 mg to 10 mg; and the cathode catalyst is selected from the group consisting of platinum-supported nickel foam, and nickel phosphide-supported nickel foam.

2. The method according to claim 1, wherein in the anode catalyst, the palladium element supported on per square centimeter of the nickel foam has a total amount ranging from 1 mg to 8 mg; and in the cathode catalyst, the platinum or the nickel phosphide supported on per square centimeter of the nickel foam metal has a total amount ranging from 0.2 mg to 2 mg.

3. The method according to claim 1, wherein a molar concentration ratio of the ethylene glycol to alkali is 1:1 to 1:5 in the alkaline electrolyte containing the ethylene glycol.

4. The method according to claim 3, wherein the alkali is potassium hydroxide or sodium hydroxide.

5. The method according to claim 1, wherein the applied voltage ranges from 0.5 V to 1.5 V.

6. The method according to claim 5, wherein after the electrocatalytic reaction, the method further comprises an operation of separating and purifying the glycollate, and the operation comprises: carrying out color removal through activated carbon, drying, washing, dissolution and filtering, and recrystallization on an electrolyzed solution to obtain separated and purified glycollate.

7. The method according to claim 6, wherein a washing liquid for washing is at least one selected from the group consisting of dichloromethane, methanol, ethanol and water.

8. The method according to claim 1, wherein the alkaline electrolyte containing the ethylene glycol is obtained by dissolving waste plastic polyethylene terephthalate (PET) into an alkali liquid, and carrying out solid-liquid separation after hydrolysis reaction.

9. The method according to claim 8, wherein in the anode catalyst, the palladium element supported on per square centimeter of the nickel foam has a total amount ranging from 1 mg to 8 mg; and in the cathode catalyst, the platinum or the nickel phosphide supported on per square centimeter of the nickel foam has a total amount ranging from 0.2 mg to 2 mg.

10. The method according to claim 8, wherein a molar concentration ratio of the ethylene glycol to alkali is 1:1 to 1:5 in the alkaline electrolyte containing the ethylene glycol.

11. The method according to claim 10, wherein the alkali is potassium hydroxide or sodium hydroxide.

12. The method of claim 8, wherein the applied voltage ranges from 0.5 V to 1.5 V.

13. The method of claim 12, wherein the waste plastic PET is bottle grade PET, film grade PET or fiber grade PET.

14. The method of claim 12, wherein after the electrocatalytic reaction, the method further comprises an operation of separating and purifying the glycollate, and the operation comprises: carrying out color removal through activated carbon, drying, washing, dissolution and filtering, and recrystallization on an electrolyzed solution to obtain separated and purified glycollate.

15. The method of claim 14, wherein a washing liquid for washing is at least one selected from the group consisting of dichloromethane, methanol, ethanol and water.

16. The method according to claim 1, wherein a diffraction peak at 2 theta is present around 40° in an X-ray diffraction (XRD) spectrum of the palladium-supported nickel foam.

\* \* \* \* \*